(12) United States Patent
Seibt

(10) Patent No.: US 12,440,086 B2
(45) Date of Patent: Oct. 14, 2025

(54) METHOD, DEVICE, AND COMPUTER-READABLE STORAGE MEDIUM FOR REDUCING FALSE-POSITIVE DETECTIONS IN IMAGES OF A VIDEO SIGNAL

(71) Applicant: HOYA CORPORATION, Tokyo (JP)

(72) Inventor: Hannes Seibt, Friedberg (DE)

(73) Assignee: HOYA CORPORATION, Tokyo (JP)

( * ) Notice: Subject to any disclaimer, the term of this patent is extended or adjusted under 35 U.S.C. 154(b) by 419 days.

(21) Appl. No.: 18/036,718

(22) PCT Filed: Nov. 11, 2021

(86) PCT No.: PCT/IB2021/060437
§ 371 (c)(1),
(2) Date: May 12, 2023

(87) PCT Pub. No.: WO2022/106964
PCT Pub. Date: May 27, 2022

(65) Prior Publication Data
US 2024/0008712 A1    Jan. 11, 2024

(30) Foreign Application Priority Data

Nov. 18, 2020  (DE) ............... 10 2020 130 411.0

(51) Int. Cl.
*A61B 1/00*   (2006.01)
*A61B 1/04*   (2006.01)
*G06V 10/74*  (2022.01)

(52) U.S. Cl.
CPC .. *A61B 1/000094* (2022.02); *A61B 1/000096* (2022.02); *A61B 1/04* (2013.01); *G06V 10/761* (2022.01); *A61B 1/00009* (2013.01); *G06V 2201/032* (2022.01); *G06V 2201/07* (2022.01)

(58) Field of Classification Search
None
See application file for complete search history.

(56) References Cited

U.S. PATENT DOCUMENTS

| 9,510,735 | B2 * | 12/2016 | Jürgens ............... G02B 23/2484 |
| 2013/0002844 | A1 * | 1/2013 | Shida ............... A61B 1/000094 |
| | | | 348/E7.085 |
| 2017/0225830 | A1 * | 8/2017 | Kashiwakura ..... B65D 23/0814 |

OTHER PUBLICATIONS

Notice of Reasons for Refusal issued in Japanese Patent Application No. 2023-520396, dated Jan. 9, 2024, together with an English translation.

(Continued)

*Primary Examiner* — Haris Sabah
(74) *Attorney, Agent, or Firm* — GREENBLUM & BERNSTEIN, P.L.C.

(57) ABSTRACT

An information content of a section of a current image of a series of images of a video signal is calculated, wherein the video signal has to be fed to an algorithm for calculating and indicating detections of objects in the video signal. If the calculated information content of the section of the current image is smaller than a threshold value, the calculation and indication of detections of objects for the section of at least the current image or the current image and further images of the series of images is suppressed.

16 Claims, 4 Drawing Sheets

(56) References Cited

OTHER PUBLICATIONS

Chung-Feng Jeffrey Kuo et al., *Applied Image Processing Techniques in Video Laryngoscope for Occult Tumor Detection*, Biomedical Signal Processing and Control, Aug. 31, 2019, vol. 55, #101633.
Written Opinion of the International Searching Authority issued in WIPO Patent Application No. PCT/IB2021/060437, dated May 27, 2022.
International Search Report issued in WIPO Patent Application No. PCT/IB2021/060437, dated Feb. 17, 2022.
International Preliminary Report on Patentability issued in WIPO Patent Application No. PCT/IB2021/060437, dated May 16, 2023.

* cited by examiner

METHOD, DEVICE, AND COMPUTER-READABLE STORAGE MEDIUM FOR REDUCING FALSE-POSITIVE DETECTIONS IN IMAGES OF A VIDEO SIGNAL

The present invention relates to a method, a device, and a computer-readable storage medium for reducing false-positive detections in images of a video signal.

Object detection algorithms based on artificial intelligence are particularly sensitive to non-domain objects for which they have not been trained, such as artifacts, blurred images, etc. False-positive detections resulting from this disturb the general perception and can also obscure the actual information.

An object of the present invention is to reduce false-positive detections by object detection algorithms in images of a video signal.

According to the invention, this object is achieved as specified in the attached claims.

According to a first embodiment of the invention, calculation and indication, e.g., display, of potentially false-positive detections are suppressed in images of a video signal without information content. According to a second embodiment of the invention, calculation and indication, e.g., display, of potentially false-positive detections are further suppressed in series of multiple images of the video signal without content-related connection.

According to the invention, such suppression increases the specificity of detections of object detection algorithms, in particular of object detection algorithms based on artificial intelligence. Furthermore, computing power can be saved, since the object detection algorithms need to perform the calculation and indication of detections only for images of the video signal with a certain information content.

Hereinafter, embodiments of the invention are described in more detail with reference to the accompanying drawings. The following is shown:

In the following, a first embodiment is described with reference to FIG. 1.

Figure 1:
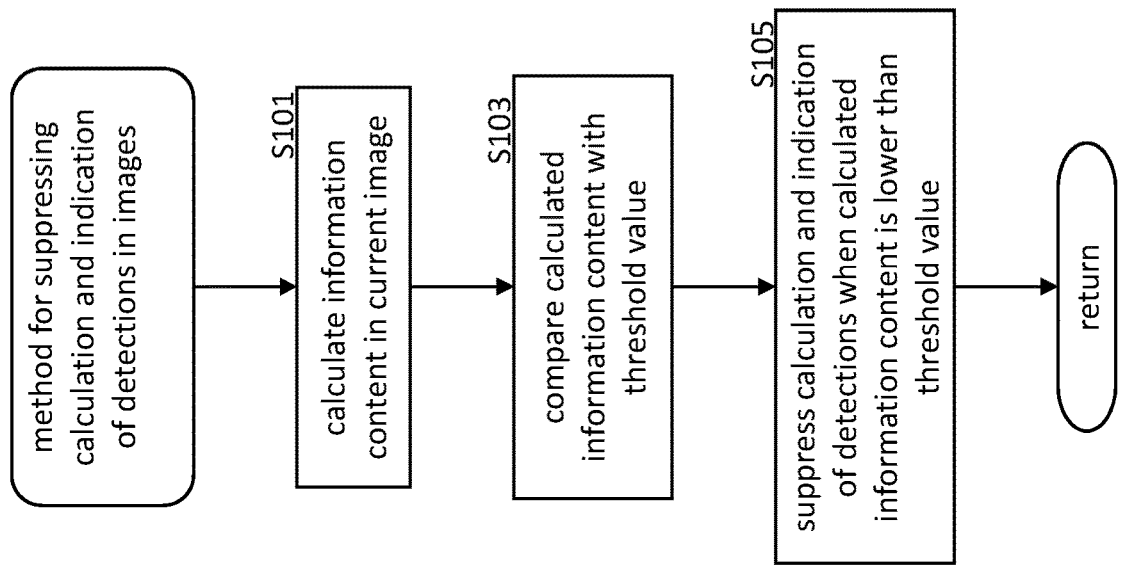
FIG. 1 shows a flowchart of a method for suppressing the calculation and indication of detections of objects in images of a video signal according to a first embodiment of the invention.

FIG. 1 illustrates a flowchart of a method for suppressing calculation and indication of detections of objects in images of a video signal according to a first embodiment.

The video signal is, for example, an endoscopic video signal detected by means of endoscopy (for example, of a gastric and/or intestinal tract) using an endoscope device, the video signal being output from the endoscope device. The objects are, for example, diagnostically relevant structures, such as lesions, polyps and the like. According to an application example of the present invention, the detection of objects comprises a detection of lesions, polyps and the like.

The endoscope device comprises a rigid endoscope, a flexible endoscope, and a capsule endoscope.

After the video signal has been processed by the method illustrated in FIG. 1, it is fed to an algorithm that calculates and indicates detections of objects in images of the processed video signal. The algorithm is based on artificial intelligence or uses machine learning techniques, for example.

In a process S101 in FIG. 1, an information content of a section of a current image of a series of images of the video signal is calculated. The information content is calculated based on, for example, an extended entropy metric. Then, it is continued with process S103.

The level of entropy of an image or image detail or image section is based on the probability distribution of an information present in the image (for example, the distribution of intensities within an 8-bit grey-scale image). To determine the information content relevant with respect to the objects, the entropy level described by Shannon is extended by including additional components, such as spatial information (for example, the first or second derivative of image intensities) or texture information (for example, Haralick Features or Local Binary Pattern) in the extended entropy metric.

In process S103, the calculated information content of the section of the current image is compared with a threshold value. Then, it is continued with process S105.

The above-mentioned threshold value is for example determined domain-specifically or with regard to the objects and verified using independent test data. Therefore, the threshold value is preferably a variable threshold value.

If it is determined that the calculated information content is lower than the threshold value, the calculation and indication of detections of objects for the section of the current image is suppressed in process S105. According to an embodiment, the calculation and indication of detections of objects is suppressed not only for the section of the current image, but also for corresponding sections in further images following the current image. The number of these further images comprises, for example, a selection from 1 to 1000 images.

The processes S101, S103 and S105 are repeated for all images of the series, for example. The images of the series may comprise part of or the entire video signal.

For example, after process S105 for a current image N, process S101 for a current image N+1 begins. Furthermore, parallel processing of processes S101, S103 and S105 with a current image N+2 in S101, a current image N+1 in S103, and a current image N in S105 is also possible.

If it is determined in process S105 that the calculated information content I is greater than or equal to the threshold value t, the calculation and indication of detections of objects for the section of the current image N or also for the further images can be admitted under certain conditions, for example.

The section comprises, for example, the entire detail of the current image. Alternatively, the section comprises portions of the current image resolved as finely as needed. For example, the section comprises portions of 2×2, 3×3, . . . etc. segments of the current image.

The method shown in FIG. 1 is implemented, for example, by a circuit device 40 shown in FIG. 4, which will be described in more detail below.

Figure 2:
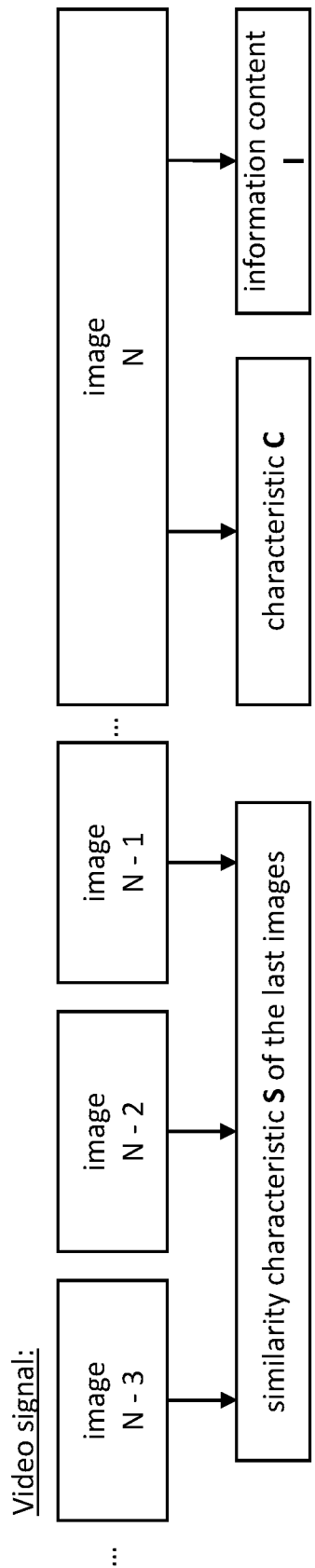
FIG. 2 shows a schematic representation to explain calculations that are performed on images of a video signal according to embodiments of the invention.

Reference is now made to FIG. 2, which shows a schematic representation to explain calculations performed on images of a video signal according to embodiments of the invention.

In the method shown in FIG. 1, an information content I is calculated for a current image N of a series of images of a video signal and compared with a threshold value.

According to a second embodiment, in addition to the information content I for the current image N, a characteristic C for the current image N is calculated. Furthermore, a similarity characteristic S is calculated via adjacent, for example previous, images N−1, N−2, N−3, . . . of the series of images of the video signal. It is noted that "adjacent images" are not limited to "previous images". For example, in case of non-real time processing of the video signal, images following the image N can also be considered for the calculation.

Figure 3:
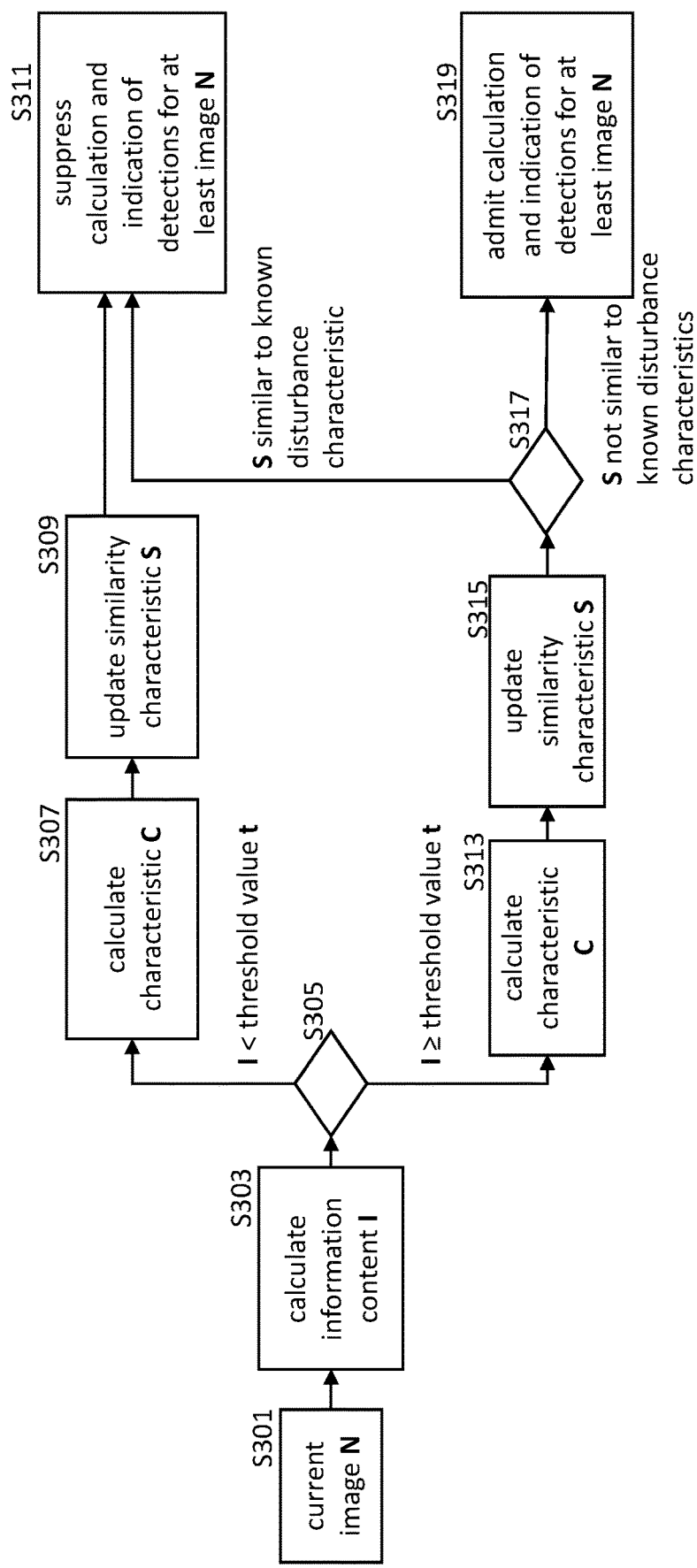
FIG. 3 shows a flowchart of a method for suppressing the calculation and indication of detections of objects in images of a video signal according to a second embodiment of the invention.

FIG. 3 shows a flowchart of a method for suppressing the calculation and indication of detections of objects in images of a video signal according to the second embodiment.

In a process S301, the current image N of the series of images of the video signal is input. Then, it is continued with process S303 in which, like in process 101, an information content I of a section of the current image N is calculated. The information content I is calculated, for example, based on an extended entropy metric as described above.

In the following process S305, as in process S103, it is determined whether or not the calculated information content I of the section of the current image N is greater than or equal to a threshold value t. That is, the information content I is compared with the threshold value t. As described above, the threshold value t is determined, for example, domain-specifically or with respect to the objects and verified using independent test data. Preferably, the threshold value t is variable.

If it is determined in process S305 that the calculated information content I is not greater than or equal to the threshold value t, this eventually leads to suppression of the calculation and indication of detections of objects for the section of the current image N or the current image N and other images in the series of images in a process S311, similar to process S105.

In the second embodiment, process S305 is followed by a process S307 when the information content I is less than the threshold value t.

In process S307, a characteristic C of the section of the current image N is calculated. In the following process S309, a similarity characteristic S is updated with the calculated characteristic C of the section of the current image N. The similarity characteristic S was calculated via adjacent images N−1, N−2, N−3, . . . of the series of images of the video signal, which are adjacent to the current image N, for example preceding it. Finally, process S309 is followed by process S311.

If it is determined in process S305 that the calculated information content I is greater than or equal to the threshold value t, it is continued with a process S313 corresponding to process S307, in which the characteristic C of the section of the current image N is calculated. The following process S315 corresponds to process S309, in which the similarity characteristic S is updated with the calculated characteristic C of the section of the current image N.

It is noted that processes S307 or S313 and S309 or S315 can also be executed before process S305. In such a configuration of the second embodiment, process S303 may also be executed after process S307 or S313, or after process S309 or S315.

In a process S317 following the process S315, it is determined whether or not the updated similarity characteristic S is similar to at least one known disturbance characteristic.

If it is determined in process S317 that the updated similarity characteristic S is similar to at least one known disturbance characteristic, it is continued with process S311 for suppressing the calculation and indication of detections of objects for the section of the current image N.

If it is determined in process S305 that the calculated information content I is greater than or equal to the threshold value t, and if it is determined in process S317 that the updated similarity characteristic S is not similar to known disturbance characteristics, process S319 follows, in which the calculation and indication of detections of objects for the section of the current image N are permitted.

The processes shown in FIG. 3 are repeated, for example, for all images in the series. The images of the series may comprise part or all of the video signal.

For example, after the process S311 or S319 for the current image N, the process S301 for a current image N+1 of the series of images of the video signal starts. However, there is no need to wait for the end of the process S311 or S319 for the current image N before inputting the current image N+1.

The processes shown in FIG. 3 can also be executed in parallel.

The suppression of the calculation and indication of detections in processes S105 and S311 comprises, for example, that at least the image N is not fed to the algorithm for calculating and indicating detections of objects, and removing it, for example, from the processed video signal which is input into said algorithm. Alternatively, at least the image N is marked in the processes S105 and S311 as an image not to be edited in the processed video signal fed to the algorithm.

Allowing the calculation and indication of detections in the process S319 includes, for example, that the image N remains in the processed video signal that is fed to the algorithm for calculating and indicating detections of objects.

In the process S307 or S313, the characteristic C of the current image N is calculated using, for example, typical features of images of the video signal. Typical features of images are found, for example, depending on the type of objects. Such features, similar to the extended entropy metric, are based on spatial information (e.g. the first or second derivative of image intensities) or texture information (e.g. Haralick Features or Local Binary Pattern). According to an implementation example, the characteristic C is a vector with intervals. According to another implementation example, the characteristic C is a kind of decision tree.

In the process S309 or S315, the similarity characteristic S is updated, for example, based on a similarity metric between the section of the current image N and the sections of the adjacent images N−1, N−2, N−3, . . . . The similarity characteristic S is composed of the characteristics C of the adjacent images N−1, N−2, N−3, . . . . It depends on the type of characteristic how the individual characteristics are linked.

The number of adjacent images N−1, N−2, N−3, . . . on the basis of which the similarity characteristic is calculated includes, for example, one image to one hundred images.

In the process S317, it is determined whether or not the updated similarity characteristic S is similar to at least one known disturbance characteristic.

A disturbance characteristic is an expression of a characteristic as described above. The disturbance characteristic is, for example, a vector with intervals or a decision tree, where it is decided at each node whether a calculated feature (e.g.

Haralick Feature) is within an interval, etc. Known, predefined disturbance characteristics include for example: Rinsing water and rinsing artifacts, blurred images caused when the lens of an endoscope device rests directly on the mucosa and therefore everything visible is outside the focus range of the lens of the endoscope device, blurred images caused by rapid movements during endoscopy or soiling of the lens of the endoscope device.

Depending on the implementation, for determining whether the updated similarity characteristic S is similar to at least one known disturbance characteristic or not, vectors of intervals or decision trees are compared and it is decided whether they are sufficiently similar or not. For example, in both cases, intervals are used to determine whether the known disturbance characteristic is included in the similarity characteristic S or vice versa.

For example, the known disturbance characteristic is a specific expression, such as a vector of features as described above, and the similarity characteristic S consists of intervals. If the individual values of the vector are within intervals of the vector of the similarity characteristic S, the known disturbance characteristic and the similarity characteristic S are similar.

On the other hand, if the similarity characteristic S is a specific expression and the known disturbance characteristic consists of intervals, which constitutes a preferred implementation, the characteristics are similar if the values of the specific expression are contained in the intervals. That is, if the similarity characteristic S is included in at least one of the known disturbance characteristics, the similarity characteristic is similar to it.

According to a configuration of the second embodiment, the calculated characteristic C of the section of the current image N is weighted, and the similarity characteristic S is updated with the weighted calculated characteristic of the section of the current image N. Thus, the influence of the images on the similarity characteristic can be controlled. For example, a weighting is applied which attributes a greater influence to the current image than to images further back in time. According to an implementation example, this relationship is linear. According to another implementation example, this relationship is coupled to further parameters.

Figure 4:
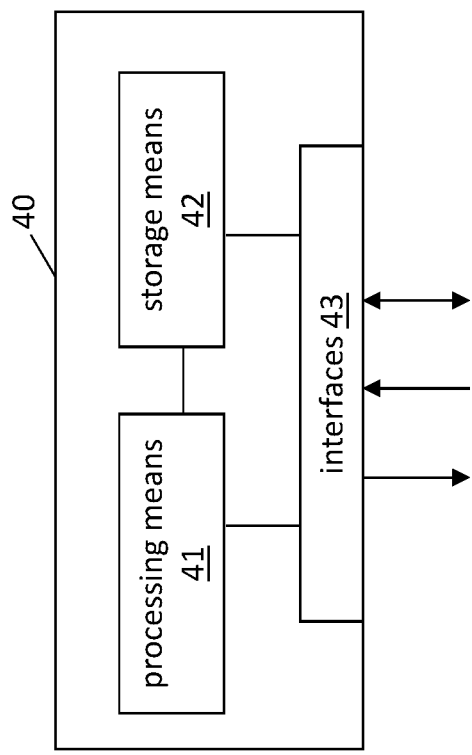
FIG. 4 shows a schematic block diagram of a circuit device in which embodiments of the invention can be implemented.

The method shown in FIG. 3 is implemented, for example, by the circuit device 40 shown in FIG. 4.

The circuit device 40 comprises processing means (e.g., processing circuitry) 41, such as one or more processors (e.g., CPUs), storage means (e.g., storage circuitry) 42, such as one or more read-only memories (ROMs), one or more random access memories (RAMs), or the like, and interfaces (e.g., interface circuitry) 43.

According to an implementation example of the invention, the storage means 42 stores a program that, when executed by the processing means 41, implements the method shown in FIG. 1 or the method shown in FIG. 3.

According to another implementation example, the method shown in FIG. 1 or FIG. 3 is implemented by a dedicated circuit structure using the processing means 41, the storage means 42, and the interfaces 43. For example, the processing means 41 and the storage means implement a calculation means, a determination means, a suppression means, or an admission means of a device according to an embodiment of the invention.

Through the interfaces 43, the circuit device 40 receives the video signal, for example from an endoscope device, on the one hand, and outputs the processed video signal to the algorithm for calculating and indicating detections of objects in the processed video signal, on the other hand.

According to the invention, a video signal is filtered based on its image content, and the video signal thus processed is fed to an algorithm for calculating and indicating detections of objects in the processed video signal. Filtering based on the image content has the advantage, compared to filtering based on characteristics and distribution of detections, that the indication of detections in the algorithm does not experience any additional delay.

The invention claimed is:

1. A method comprising:
   calculating an information content of a section of a current image of a series of images of a video signal, the video signal having to be fed to an algorithm for calculating and indicating detections of objects in the video signal,
   determining whether the calculated information content of the section of the current image is larger than or equal to a threshold value, or not, and,
   when it is determined that the calculated information content is not larger than or equal to the threshold value, suppressing the calculation and indication of detections of objects for the section of at least the current image or the current image and further images of the series of images.

2. The method according to claim 1, further comprising:
   calculating a characteristic of the section of the current image and updating a similarity characteristic by the calculated characteristic of the section of the current image, the similarity characteristic having been calculated via adjacent images of the series of images of the video signal, which are adjacent to the current image,
   when it is determined that the calculated information content is larger than or equal to the threshold value,
   determining whether the updated similarity characteristic is similar to at least one known disturbance characteristic, or not, and,
   when it is determined that the updated similarity characteristic is similar to at least one known disturbance characteristic, suppressing the calculation and indication of detections of objects for the section of at least the current image or the current image and further images of the series of images.

3. The method according to claim 2, further comprising,
   when it is determined that the calculated information content is larger than or equal to the threshold value, and when it is determined that the updated similarity characteristic is not similar to known disturbance characteristics, admitting the calculation and indication of detections of objects for the section of the current image or of the current image and the further images of the series of images.

4. The method according to claim 2, wherein the similarity characteristic is updated on the basis of a similarity metric between the section of the current image and the sections of the adjacent images.

5. The method according to claim 2, wherein
   a number of the adjacent images comprises a selection from a series of 1 to 1,000 images, and/or
   a number of the further images comprises a selection from a series of 1 to 1,000 images.

6. The method according to claim 2, further comprising weighting the calculated characteristic of the section of the current image,
   wherein the similarity characteristic is updated by the weighted calculated characteristic of the section of the current image.

7. The method according to claim 1, wherein the information content is calculated on the basis of an extended entropy metric.

8. The method according to claim 1, wherein the section comprises the entire detail of the current image or partial areas of the current image resolved as finely as needed.

9. The method according to claim 1, wherein
the video signal is an endoscopic video signal, and/or
the objects are diagnostically relevant structures, and/or
the algorithm is based on artificial intelligence or uses machine learning techniques, and/or
the threshold value is variable.

10. The method according to claim 1, wherein the method is repeated for the images of the series.

11. A non-transitory computer-readable storage medium storing a program that causes a computer to carry out the method according to claim 1 when the program is running on the computer.

12. A device comprising
a calculation processor for calculating an information content of a section of a current image of a series of images of a video signal, the video signal having to be fed to an algorithm for calculating and indicating detections of objects in the video signal,
a determination processor for determining whether the calculated information content of the section of the current image is larger than or equal to a threshold value or not, and
a suppression processor which, when the determination processor determines that the calculated information content is not larger than or equal to the threshold value, is configured to suppress the calculation and indication of detections of objects for the section of at least the current image or the current image and further images of the series of images.

13. The device according to claim 12, wherein
the calculation processor is configured to calculate a similarity characteristic over adjacent images of the series of images of the video signal, which are adjacent to the current image, and for calculating a characteristic of the section of the current image and for updating the similarity characteristic by the calculated characteristic of the section of the current image,
the determination processor, when having determined that the calculated information content is larger than or equal to the threshold value, is configured to determine whether the updated similarity characteristic is similar to at least one known disturbance characteristic, or not, and,
the suppressing processor, when the determination processor determines that the updated similarity characteristic is similar to at least one known disturbance characteristic, is configured to suppress the calculation and indication of detections of objects for the section of at least the current image or the current image and further images of the series of images.

14. The device according to claim 13, further comprising an admission processor which, when the determination processor determines that the calculated information content is larger than or equal to the threshold value, and that the updated similarity characteristic is not similar to known disturbance characteristics, is configured to admit the calculation and indication of detections of objects for the section of the current image or the current image and the further images.

15. The device according to claim 13, wherein
the calculation processor is configured to weight the calculated characteristic of the section of the current image and update the similarity characteristic by the weighted calculated characteristic of the section of the current image.

16. The device according to claim 12, wherein the video signal is an endoscopic video signal and the objects are diagnostically relevant structures comprising lesions and/or polyps.

* * * * *